2,956,967
PHENOLIC-FORMALDEHYDE RESIN COMPOSITIONS

Robert Steckler, Chagrin Falls, Ohio, assignor to General Aniline & Film Corporation, New York, N.Y., a corporation of Delaware No Drawing. Filed Sept. 5, 1958, Ser. No. 759,124

10 Claims. (Cl. 260—19)

The present invention relates to a plasticized phenolic-formaldehyde resin composition having excellent flexibility and resistance to flaking or cracking.

It is known that phenols such as phenol per se, resorcinol, alkyl phenols, i.e. cresols, xylenols, phloroglucinol, etc. react with aldehydes (commonly formaldehyde) or ketones to form a variety of products. The nature of the resinous product depends on the choice of the phenolic compound and the aldehyde or ketone and on the conditions of the reaction. Phenolic-formaldehyde resins are of two main types. The resins resemble either the phenol alcohols or the dihydroxydiphenylalkanes in basic structure. If they are prepared with an excess of formaldehyde and an alkaline catalyst they will resemble the phenol alcohols and have methylol side or end groups. The molar ratio of formaldehyde phenolic compound used may vary in a ratio from 1:1 to 3:1, e.g.:

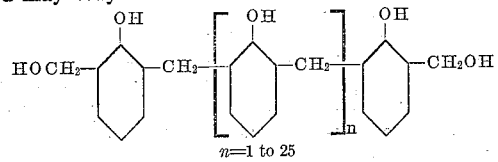

$n = 1$ to 25

Such resins are often referred to as resoles. They are capable of being cured by the application of heat and sometimes acids, cure resulting through condensation of the methylol groups. By cooling the resin the reactions may be conveniently stopped, or at least effectively retarded, anywhere between the addition of the formaldehyde and the final curing process. To resume the reaction, the temperature is raised or an acidic catalyst is added. Since there is no sharp break in these reactions such resins have been termed the one-stage resins.

The majority of the one-stage resins employ formaldehyde as the aldehyde, although certain other aldehydes may be used. Formaldehyde is preferred because of its high reactivity and freedom from side reactions.

On the other hand, if the phenolic resin is prepared with an acidic catalyst and less than a mole of formaldehyde per mole of phenolic compound, the resin will resemble a dihydroxydiphenylmethane in structure, e.g., the chains are phenol ended. The molar ratio of formaldehyde to phenolic compound used may vary anywhere from 1:2 to 1:1, e.g.:

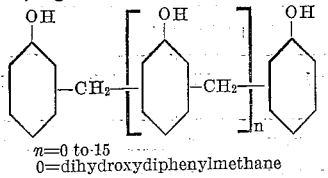

$n = 0$ to 15
$0 = $ dihydroxydiphenylmethane

The resins, commonly referred to as novolak, are permanently soluble and fusible and will cure upon the addition of formaldehyde (in the form of paraformaldehyde), or hexamethylenetetramine. As the preparation of the novolak resin represents one process and the addition of the curing agent represents a separate and distinct process, resins based on a novolak resin and a curing agent are referred to as two-stage resins.

Thermosetting phenolic-formaldehyde resins have certain inherent drawbacks which prevent their full commercial use as coating materials for the formation of films. In other words, such resins are brittle and have extremely poor resistance to flaking or cracking. These drawbacks are attributable to the lack of flexibility, elongation and adhesion of the cured film resulting from such phenolic formaldehyde resins. Attempts to overcome these defects by incorporating any of the commercially available plasticizers yielded no improved results. Dioctyl phthalate, which is one of the most versatile plasticizers for various types of resins, proved ineffective in imparting flexibility and resistance to flaking or cracking of phenolic-formaldehyde resins.

It is an object of this invention to overcome the foregoing difficulties and to provide a plasticized phenolic-formaldehyde resin which possesses excellent flexibility and elongation, and resistance to flaking or cracking.

Other objects and advantages will become more clearly apparent from the following specification.

I have found that phenolic-formaldehyde resins of the foregoing type, i.e. prepared from any phenolic compound such as phenol, alkylated phenols, e.g. m- and p-cresols, resorcinol, phloroglucinol, xylenol, etc., and formaldehyde, are successfully plasticized by employing a mixture of 30–100 parts by weight of a polyalkoxy acetal and 1–15 parts by weight of an organic titanium chelate per 100 parts by weight, based on the non-volatile content, of a phenolic-formaldehyde resin. It is to be noted that such resins are prepared in solution form, i.e., in volatile solvents such as the lower alcohols, ketones, etc. Films cast from such a mixture containing the polyalkoxy acetal and chelate and whether further diluted or not by solvents such as ketones, alcohols, dioxane, etc., display excellent flexibility and resistance to flaking or cracking. The polyalkoxy acetal and the organic titanium chelate is merely blended in the aforestated ratios with the phenolic-formaldehyde resin and the resulting composition employed in the preparation of coatings, films, etc., in the well known manner.

Since the phenolic-formaldehyde resins are readily available on the open market and the procedure for their preparation is well known to those skilled in the art, references to literature or patents need not be made herein. However, for purposes of illustration, a procedure which yields a phenolic-formaldehyde resin soluble in the lower alcohols, such as methanol, ethanol, n-propanol or isopropanol, or ketones, glycol ethers, dioxane, and similar polar solvents, is as follows:

To a 3-necked resin flask, equipped with a stirrer, thermometer and reflux condenser, were added 927 parts by weight of phenol, 927 parts by weight of formaldehyde (40% aqueous solution) and 10 parts by weight of concentrated ammonia. The mixture was refluxed with agitation until a drop of the reaction mixture cures into a resinous mass on a hot plate at a temperature of 200° C. in 1½ seconds. When this stage is reached, the resin is then dehydrated at 50° C. and 26″ vacuum for a period of 3⅓ hours during which the temperature is finally raised to 100° C. The resin is then dissolved in a lower alcohol such as methanol, ethanol, isopropanol to yield a 45–60% solution, preferably a 50% solution. In this case, ethanol was employed as the solvent to yield a 50% solution. The resulting phenol-formaldehyde resin in solution is of the phenol-alcohol type.

The polyalkoxy acetals which are blended with the organic titanium chelate are characterized by the following general formula:

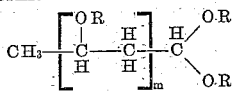

wherein R represents an alkyl radical of 1 to 5 carbon atoms, e.g. methyl, ethyl, propyl, isopropyl, butyl, amyl, etc., and $m$ represents an integer of 5 to 25.

As illustrations of such polyalkoxy acetals, the following may be mentioned:

A. 1,1,3,5,7-pentamethoxy octane
B. 1,1,3,5,7,9-hexamethoxy decane
C. 1,1,3,5,7,9,11-heptamethoxy dodecane
D. 1,1,3,5,7,9,11,13-octamethoxy tetradecane
E. 1,1-diethoxy-3,5,7-ethoxy decane
F. 1,1-dimethoxy-3,5,7-triethoxy octane The polyalkoxy acetals are obtained by condensing 1 mole of either methanol, ethanol, propanol, butanol or pentanol with 5-25 moles of vinyl methyl ether.

The following polyalkoxy acetals were prepared while employing 1 mole of a lower alcohol of 1 to 5 carbon atoms with 5 to 25 moles of vinyl methyl ether. For purposes of simplification and identification, the abbreviation PMAC followed by a numeral will designate that the condensation product was obtained by condensing 1 mole of methanol with the numerical designation in moles of vinyl methyl ether. For example, when 1 mole of methanol is condensed with 15 moles of vinyl methyl ether, the product is designated as PMAC-15; with ethanol it will be designated as PEAC; with propanol PPAC, with butanol PBAC and with pentanol or normal amyl alcohol as PAAC.

H. PMAC-10
I. PMAC-15
J. PMAC-25
K. PEAC-10
L. PEAC-15
M. PPAC-15
N. PBAC-15
O. PBAC-25
P. PAAC-10
Q. PAAC-15
R. PAAC-20
S. PAAC-25

It is to be further noted that a mixture of two or more of the above polyalkoxy acetals may be employed with the organic titanium chelate.

The foregoing polyalkoxy acetals and numerous species thereof are prepared in accordance with the methods disclosed in U.S. Patents 2,165,962 and 2,487,525. The methods of their preparation and the various species disclosed therein, which conform to the foregoing general formula are incorporated herein by reference thereto.

The organic titanium chelates that I employ in combination with the polyalkoxy acetals, are readily obtained in the usual manner by reacting 1 mole of a titanium ortho ester with 2, 2.2, 3 or 4 moles of either octyl glycol (2 - ethylhexanediol - 1,3), triethanolamine, triethanolamine-N-salts of fatty acids such as butyric, caproic, caprylic, capric, undecylic, myristic, palmitic, oleic, linoleic, stearic or any of the fatty acids whether saturated or unsaturated so long as they contain from 4 to 18 carbon atoms.

The titanium ortho esters utilized in the preparation of the corresponding chelates are well known and are characterized by the following general formula:

$$Ti(OR)_4$$

wherein R represents an alkyl group of one of the 3 to 18 carbon atoms, i.e. propyl, butyl, hexyl, octyl, nonyl, decyl, dodecyl, cetyl, octadecyl, etc. As illustrations of such titanium ortho esters, many of which are commercially available, I have found the following to be especially adaptable for the preparation of the corresponding chelates:

Tetraisopropyl titanate
Tetra n-butyl titanate
Tetra n-amyl titanate
Tetrahexyl titanate
Tetra-2-ethylhexyl titanate
Tetraheptyl titanate
Tetraoctyl titanate
Tetranonyl titanate
Tetradecyl titanate
Tetrahendecyl titanate
Tetradodecyl titanate
Tetracetyl titanate
Tetrastearyl titanate The organic titanium chelates (all of which are commercially available under various brand or trade names) are, as pointed out above, readily obtained by reacting in the conventional manner 2, 2.2, 3 or 4 moles of the chelating compound such as octylene glycol, triethanolamine, a fatty acid salt of triethanolamine or a fatty acid of 3 to 18 carbon atoms with 1 mole of any one of the above titanium ortho esters. The triethanolamine titanate N-salts of fatty acids are readily obtained by reacting 2 moles of triethanolamine with 1 mole of the titanium ester of 1 or 2 moles of a fatty acid. All of the chelates utilized in accordance with the present invention are characterized by the following general formula:

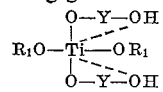

wherein $R_1$ represents either hydrogen or an alkyl radical from 3 to 18 carbon atoms and Y represents the chelating radical which is linked to two or more electron donating atoms such as oxygen or hydrogen and characterized by octylene glycol, triethanolamine or a fatty acid. Such titanium chelates can also be prepared by reacting glycols of 4 to 8 carbon atoms or amino alcohols such as triethanolamine in ratios of 2, 2.2, 3 or 4 moles per mole of titanium ortho ester. The titanium chelates based on amino alcohols can be further reacted with partial or complete neutralization with fatty acids of 3 to 18 carbon atoms.

As examples of titanium chelates that may be used in conjunction with any one of the foregoing polyalkoxy acetals, the following are illustrative:

| Organic Titanium Chelate | Molar Proportions | | | |
|---|---|---|---|---|
| | Chelating Compound | Ti | Acid | Employed as Solution |
| 1. Octylene glycol titanate (OGT-21)* | 2 moles Octylene glycol (2-ethyl-hexanediol-1,3). | 1 | | 40% in butanol. |
| 2. Octylene glycol titanate (OGT-2.21) | 2.2 moles Octylene glycol (2-ethyl-hexanediol-1,3). | 1 | | 38% in butanol. |
| 3. Octylene glycol titanate (OGT-31) | 3 moles Octylene glycol (2-ethyl-hexanediol-1,3). | 1 | | 40% in butanol. |
| 4. Octylene glycol titanate (OGT-41) | 4 moles Octylene glycol (2-ethyl-hexanediol-1,3). | 1 | | Do. |
| 5. Triethanolamine titanate (TAT-21) | 2 moles Triethanolamine | 1 | | 59% in isopropanol. |
| 6. Triethanolamine titanate-N-oleate (TAT-O-211). | do | 1 | 1 oleic | Do. |
| 7. Triethanolamine titanate-N-oleate (TAT-O-212). | do | 1 | 2 oleic | Do. |
| 8. Triethanolamine titanate-N-stearate (TAT-S-211). | do | 1 | 1 stearic | Do. |
| 9. Triethanolamine titanate-N-linseed acids salt (TAT-L-211). | do | 1 | 1 linseed fatty acids. | Do. |

It is to be noted at the outset that the use of any one of the foregoing polyalkoxy acetals per se, including mixtures thereof, does not yield a plasticized phenol-formaldehyde resin having resistance to flaking or cracking. Similarly, the use of the organic titanium chelate per se does not yield a plasticized film which will exhibit resistance to flaking or cracking. It is only the combination of the two in the aforestated proportions which yields a completely plasticized film having unusual resistance to flaking or cracking, as will be shown hereinafter.

The following examples will illustrate the various ways in which phenolic-formaldehyde resin may be plasticized to yield a composition which in film form possesses excellent flexibility and resistance to flaking or cracking. All parts given are by weight.

*Example I*

A film of the above prepared resin solution was cast on a 20 gauge automotive steel panel while employing a gauge with a 5 mil clearance. After ½ hour of air drying, the film was baked for a period of ½ hour at a temperature of 175° C. The cured film had a thickness of approximately 1 mil. The film was then evaluated for flexibility while employing a General Electric impact-flexibility tester and was found to give an impact elongation of 1%. This low figure is clearly indicative of a very brittle, poorly plasticized film.

The foregoing flexibility tester is commercially available on the open market and entails a solid metal cylinder which is dropped through a guide trap from a slide of approximately 4 feet. The impactor strikes the reverse side of the coated test panel which is supported by a rubber pad so that the circular imprint of the impactor is barely definable in the panel metal. Each end of the impactor is studded with a group of protruding spherical knobs arranged in a circle. After impact, the film is distended according to the curvature of the spherical surface forming a knob. The percent elongation of the film is a function solely of the geometry of the knob itself, and is not dependent upon the rate of draw, thickness of the metal panel or other dimensions. This apparatus was chosen because it is ideal for testing resin films for their flexibility, either air dried or baked on a metal panel.

*Example II*

To 100 parts of the phenolic-formaldehyde resin solution as prepared above, were added 25 parts of a polyalkoxy acetal obtained by condensing 1 mole of methanol with 15 moles of vinyl methyl ether (PMAC–15). A film was cast on a 20 gauge automotive steel panel while using a gauge with a 5 mil clearance. The coated film was air dried for ½ hour followed by baking at 175° C. for ½ hour. The cured film had a thickness of approximately 1 mil and when evaluated with the General Electric impact elongation tester gave an impact elongation of approximately 1%. This figure indicates a very poorly plasticized film which is unsuitable wherein resistance to flaking or cracking is a prerequisite.

*Example III*

To 100 parts of the phenolic-formaldehyde resin solution prepared as above, were added 15 parts of octylene glycol titanate (commercially available under the brand name OGT–2.21 and containing 38% non-volatile in n-butanol). The mixture was stirred and a film cast in the same manner as in Example I. The dried and cured film gave an impact elongation of ½% thus indicating a very poorly plasticized and very brittle film.

From the foregoing examples, it is clearly evident that the use of either a polyalkoxy acetal or an organic titanium chelate by itself as a plasticizer in the phenolic-formaldehyde resin gives a very poorly plasticized film having no resistance to flaking or cracking. In other words, the resulting film is not only poorly plasticized but very brittle. The new and unexpected feature in accordance with the present invention is that when a polyalkoxy acetal is employed together with the organic titanium chelate in the aforementioned porportions a new effect is obtained yielding complete plasticization and as a consequence a film which is highly resistant to flaking or cracking. The use of organic tin or zirconium chelates by themselves produces no beneficial effect whatsoever when employed alone as a plasticizer for the phenolic resin. The same finding was noted when the organic zirconium and tin chelates were used in conjunction with polyalkoxy acetals in the aforementioned concentrations.

*Example IV*

A large quantity of phenolic-formaldehyde resin solution was prepared in accordance with the foregoing procedure. In addition, a sufficient quantity of a commercially available phenolic-formaldehyde resin in alcohol, sold under the brand name of Resinox P–97% (50% of resin in ethanol), was obtained and utilized for test purposes. Both of the resin solutions were allocated into separate portions each containing 100 parts by weight of the resin based on the non-volatile basis to which was added a mixture of polyalkoxy acetal and the organic titanium chelate in various proportions. The resulting solutions were cast as in Example I and then evaluated on the General Electric impact elongation tester. The results obtained are tabulated in the following table:

| Organic Titanium Chelate | Parts | Polyalkoxy Acetal | Parts | Parts of Phenol-formaldehyde Resin of Illustration | Parts of P-97 | Percent E.G. Impact Elongation |
|---|---|---|---|---|---|---|
| 1 | 5 | A | 30 | 100 | | 40 |
| 2 | 5 | F | 30 | | 100 | 40 |
| 3 | 10 | H | 30 | 100 | | 60 |
| 4 | 15 | I | 30 | | 100 | 60 |
| 5 | 20 | J | 35 | 100 | | 60 |
| 6 | 25 | M | 30 | | 100 | 40 |
| 7 | 30 | P | 30 | 100 | | 40 |
| 8 | 5 | Q | 30 | | 100 | 40 |
| 9 | 10 | S | 30 | 100 | | 40 |

From the foregoing table it becomes clearly manifest that a mixture of at least 30 parts by weight of a polyalkoxy acetal and 1 to 15 parts by weight of the organic titanium chelate per 100 parts of phenolic-formaldehyde resin containing 100% solids yields exceptionally good plasticized films possessing resistance to cracking or flaking. The higher percent of elongation is always indicative of a very well plasticized film.

In order to determine what effect varying amounts of the organic titanium chelate would have on the finished film, 9 separate solutions were prepared in accordance with the foregoing procedure and the following results obtained:

| Components | All parts by weight based on non-volatile basis Solution | | | | | | | | |
|---|---|---|---|---|---|---|---|---|---|
| | 1 | 2 | 3 | 4 | 5 | 6 | 7 | 8 | 9 |
| Resinox P–97 | 67 | 67 | 67 | 67 | 67 | 67 | 67 | 67 | 67 |
| PMAC–15 | 33 | 33 | 33 | 33 | 33 | 33 | 48 | 43 | 40 |
| Triethanolamine titanate (TAT–21) | 0 | 1 | 2.5 | 5 | 10 | 15 | 0 | 5 | 0 |
| G.E. Impact Elongation, percent | 1 | 5 | 20 | 40 | 40 | 20 | 1 | 40 | 1 |

From the above results, it is clearly evident that increasing the PMAC–15 without the presence of the chelate yields poorly plasticized films. As little as 1 part of the chelate per 33 parts of PMAC–15 gives decidely superior results.

Instead of employing straight alcohol solutions of the phenolic-formaldehyde resins, it is possible to incorporate various fillers and pigments in addition to the polyalkoxy acetal and organic titanium chelates to yield coating compositions having many desirable properties wherein flexibility and resistance to cracking or flaking are necessary prerequisites. The resulting coating compositions are particularly adaptable as bake on enamels. After spray coating application, the enamel is baked for 20–45 minutes at a temperature of 165°–180° C., preferably at 175° C.

I claim:

1. A heat curable coating composition comprising 100 parts by weight of a phenol-formaldehyde resin, 30 to 100 parts by weight of a polyalkoxyacetal having the following general formula:

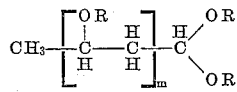

wherein R is an alkyl group of 1 to 5 carbon atoms and $m$ represents an integer of 5 to 25, and 1 to 15 parts by weight of an organic titanium chelate having the following general formula:

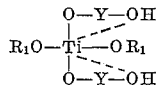

wherein $R_1$ represents a member selected from the class consisting of hydrogen and an alkyl group of from 3 to 18 carbon atoms, and Y represents a chelating radical selected from the class consisting of the radical of octylene glycol and

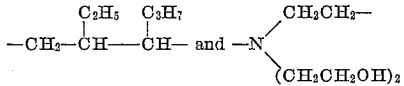

2. A heat curable coating composition according to claim 1 wherein the chelating radical is

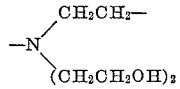

3. A heat curable coating composition according to claim 2 wherein the triethanolamine chelate radical is neutralized with a fatty acid of from 3 to 18 carbon atoms.

4. A heat curable coating composition according to claim 3 wherein the fatty acid is oleic acid.

5. A heat curable coating composition according to claim 3 wherein the fatty acid is stearic acid.

6. A process of obtaining a heat cured film having flexibility and resistance to flaking and cracking consisting of coating a surface with a composition comprising 100 parts by weight of a phenol-formaldehyde resin, 30 to 100 parts by weight of a polyalkoxy acetal having the following general formula:

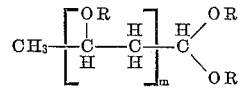

wherein R is an alkyl group of 1 to 5 carbon atoms and $m$ represents an integer of 5 to 25, and 1 to 15 parts by weight of an organic titanium chelate having the following general formula:

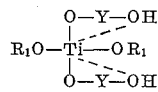

wherein $R_1$ represents a member selected from the class consisting of hydrogen and an alkyl group of from 3 to 18 carbon atoms, and Y represents a chelating radical selected from the class consisting of the radical of octylene glycol and

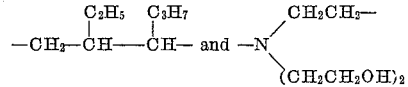

7. The process according to claim 6 wherein the chelating radical is

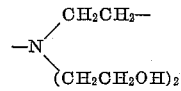

8. The process according to claim 7 wherein the triethanolamine chelate radical is neutralized with a fatty acid of from 3 to 18 carbon atoms.

9. The process according to claim 8 wherein the fatty acid is oleic acid.

10. The process according to claim 8 wherein the fatty acid is stearic acid.

References Cited in the file of this patent

UNITED STATES PATENTS

| | | |
|---|---|---|
| 2,689,858 | Boyd | Sept. 21, 1954 |
| 2,809,184 | Langer | Oct. 8, 1957 |
| 2,871,222 | Finestone | Jan. 27, 1959 |
| 2,901,450 | Beacham | Aug. 25, 1959 |